United States Patent
Aizawa

(10) Patent No.: US 7,937,652 B2
(45) Date of Patent: May 3, 2011

(54) DOCUMENT PROCESSING DEVICE, COMPUTER READABLE RECORDING MEDIUM, AND COMPUTER DATA SIGNAL

(75) Inventor: Daigo Aizawa, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 783 days.

(21) Appl. No.: 11/761,113

(22) Filed: Jun. 11, 2007

(65) Prior Publication Data

US 2008/0134023 A1 Jun. 5, 2008

(30) Foreign Application Priority Data

Nov. 30, 2006 (JP) .................................. 2006-323709

(51) Int. Cl.
G06F 21/00 (2006.01)
(52) U.S. Cl. ......... 715/232; 715/229; 715/230; 715/233
(58) Field of Classification Search ............... 715/200, 715/229, 230, 232, 233, 255
See application file for complete search history.

(56) References Cited

U.S. PATENT DOCUMENTS

| | | | |
|---|---|---|---|
| 5,623,661 A * | 4/1997 | Hon | 1/1 |
| 5,671,428 A | 9/1997 | Muranaga et al. | |
| 5,806,078 A * | 9/1998 | Hug et al. | 715/205 |
| 6,317,777 B1 * | 11/2001 | Skarbo et al. | 709/204 |
| 6,421,717 B1 * | 7/2002 | Kloba et al. | 709/219 |
| 7,310,653 B2 * | 12/2007 | Coyle et al. | 1/1 |
| 7,594,163 B2 * | 9/2009 | Slack-Smith | 715/200 |
| 7,627,615 B2 * | 12/2009 | McMahon | 1/1 |
| 2002/0112082 A1 * | 8/2002 | Ko et al. | 709/246 |
| 2002/0138511 A1 * | 9/2002 | Psounis et al. | 707/501.1 |
| 2003/0120690 A1 * | 6/2003 | Schaeffer et al. | 707/500 |
| 2003/0225826 A1 * | 12/2003 | McKellar et al. | 709/203 |
| 2004/0148278 A1 * | 7/2004 | Milo et al. | 707/3 |
| 2004/0215664 A1 | 10/2004 | Hennings et al. | |
| 2005/0138540 A1 * | 6/2005 | Baltus et al. | 715/511 |
| 2006/0150079 A1 | 7/2006 | Albornoz et al. | |
| 2007/0043686 A1 * | 2/2007 | Teng et al. | 707/1 |

FOREIGN PATENT DOCUMENTS

| | | |
|---|---|---|
| EP | 1 083 492 A2 | 3/2001 |
| JP | 07-078138 A | 3/1995 |
| JP | 2002-269124 A | 9/2002 |
| JP | 2006-235950 A | 9/2006 |

OTHER PUBLICATIONS

Chinese Office Action corresponding to Chinese Patent Appl. No. 2007101418448 dated Aug. 14, 2009.
Australian Office Action for Australian patent application No. 2007202768 dated May 21, 2009.

* cited by examiner

Primary Examiner — Stephen S Hong
Assistant Examiner — Gregory J Vaughn
(74) Attorney, Agent, or Firm — Sughrue Mion, PLLC

(57) ABSTRACT

According to an aspect of the invention, there is provided a document processing device, comprising a holding unit that holds document information and additional information in association with each other, and an additional information modification unit that modifies, when the document information held in the holding unit is changed, the addition information associated with the changed document information, according to a rule.

15 Claims, 4 Drawing Sheets

FIG. 4A

| ADDITIONAL INFORMATION IDENTIFIER | DOCUMENT IDENTIFIER | VERSION INFORMATION | POSITION | | CONTENT |
|---|---|---|---|---|---|
| | | | PAGE | x,y | |
| xxxx | yyyy | vvvv | pppp | x₁,y₁ | aaaa··· |
| ... | ... | ... | ... | ... | ... |

FIG. 4B

| USER NAME | ADDITIONAL INFORMATION IDENTIFIER | PARENT IDENTIFIER | ATTRIBUTE | POSITION | | SIZE | DOCUMENT IDENTIFIER | VERSION INFORMATION | CONTENT | STRIP COLOR | ... |
|---|---|---|---|---|---|---|---|---|---|---|---|
| | | | | PAGE | x,y | | | | | | |
| cccc | xxxx | nnnn | yyyy | pppp | x₁,y₁ | ssss | zzzz | vvvv | aaaa··· | bbb | ... |
| ... | ... | ... | ... | ... | ... | ... | ... | ... | ... | ... | ... |

DOCUMENT PROCESSING DEVICE, COMPUTER READABLE RECORDING MEDIUM, AND COMPUTER DATA SIGNAL

CROSS-REFERENCE TO RELATED APPLICATIONS

This application is based on and claims priority under 35 U.S.C. 119 from Japanese Patent Application No. 2006-323709 Filed on Feb. 19, 2006.

BACKGROUND

1. Technical field

The present invention relates to a document processing device, a computer readable recording medium, and a computer data signal.

2. Related Art

There is available a system for use in a company organization, or the like, for enabling common viewing of a produced document by the company staff. Specifically, some of the systems can add additional information (annotation), such as designation of a corrected point, in a document to be reviewed.

SUMMARY

According to an aspect of the invention, there is provided a document processing device, comprising a holding unit that holds document information and additional information in association with each other, and an additional information modification unit that modifies, when the document information held in the holding unit is changed, the addition information associated with the changed document information, according to a predetermined rule.

BRIEF DESCRIPTION OF THE DRAWINGS

An exemplary embodiment of the present invention will be described in detail based on the following figures, wherein:

FIGS. 4A and 4B are diagrams explaining example additional information held in the document management device according to the exemplary embodiment of the present invention.

DETAILED DESCRIPTION

Figure 1:
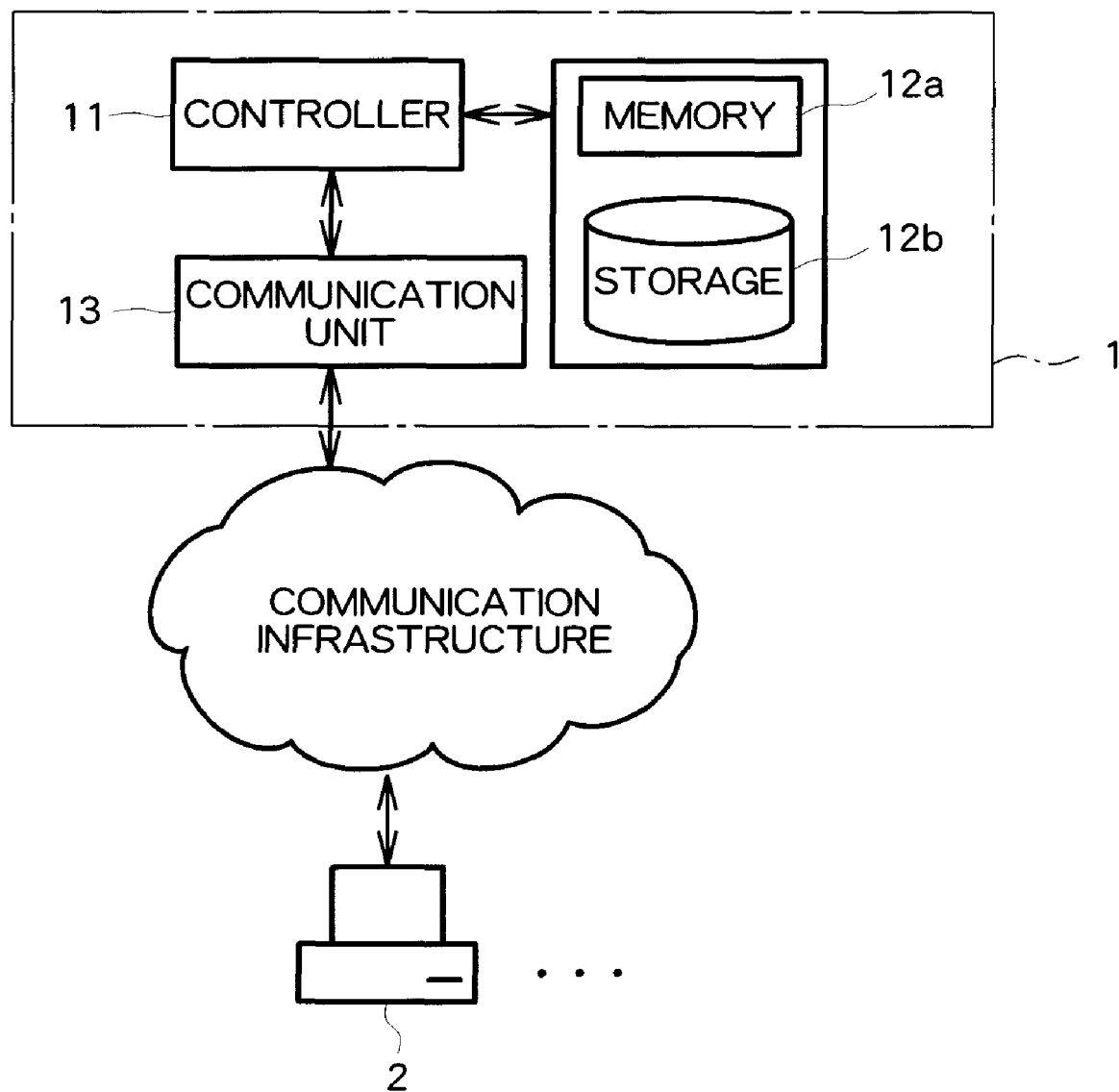
FIG. 1 is a block diagram showing an example structure of a document management device according to an exemplary embodiment of the present invention.

An exemplary embodiment of the present invention will be described with reference to the accompanying drawings. According to the exemplary embodiment of the present invention, as shown in FIG. 1, a document management device 1 includes a controller 11, a memory unit 12, and a communication unit 13, and is connected via a communication infrastructure to a client device 2.

The controller 11 is a program control device, such as a CPU, or the like, and operates according to a program stored in the memory unit 12. In this exemplary embodiment, the controller 11 performs control so as to store document information containing at least one of character strings, a drawing, an image, and so forth in the memory unit 12, and, in response to a request, distributes the document information stored in the memory unit 12 to the client device 2 via a communication infrastructure, such as a network, or the like. Further, according to an instruction from the client device 2, the controller 11 performs control so as to store additional information in the memory unit 12 in association with the document information stored therein. When the document information is changed, the controller 11 modifies the additional information associated with the changed point in the document information. The details of the process carried out by the controller 11 will be described later.

The memory unit 12 includes a memory 12a and a storage 12b. The memory 12a includes a memory device, or the like, such as a RAM (Random Access Memory), a ROM (Read Only Memory), or the like. The storage 12b may be a hard disk or the like, for example, serving as a device for holding information, and holds document information and additional information. In this exemplary embodiment, the controller 11 operates according to a program stored in a computer readable storage medium, such as the memory 12a, the storage 12b, or the like. The program may alternatively be provided as stored in a computer readable recording medium, such as a CD-ROM, a DVD-ROM, or the like.

The communication unit 13 may be a network interface or the like, for example, for receiving data etc. relevant to various requests from the client device 2 connected thereto via the communication infrastructure, such as a network, or the like, and forwarding the received data to the controller 11. Further, in response to an instruction from the controller 11, the communication unit 13 sends data relevant to the document information and the additional information to the client device 2.

The client device 2 may be a personal computer or the like, for example, and according to a user instruction produces document information and stores the produced document information in the document management device 1. Further, the client device 2 works on the document management device 1 to read and display the document information held therein, and also to hold therein additional information in association with the document information held therein. Still further, the client device 2 receives a user instruction for revising the stored document information, and in response to the received instruction, stores the revised document information in the document management device 1 in association with the stored relevant document information before the revision.

Figure 2:
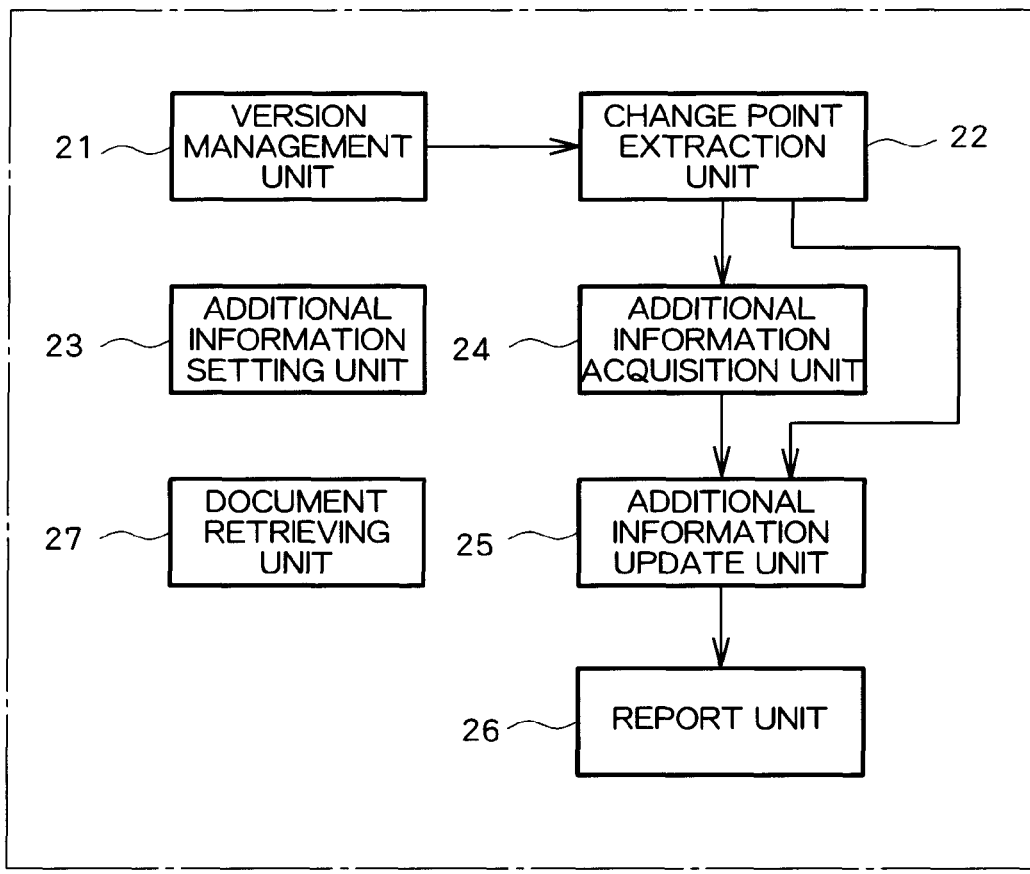
FIG. 2 is block diagram showing an example function of the document management device according to the exemplary embodiment of the present invention.

As shown in FIG. 2, in this exemplary embodiment, the document management device 1 includes, in terms of functions, a version management unit 21, a change point extraction unit 22, an additional information setting unit 23, an additional information acquisition unit 24, an additional information update unit 25, a report unit 26, and a document retrieving unit 27. The respective functions are realized by controlling the controller 11 by means of software.

Figure 3:
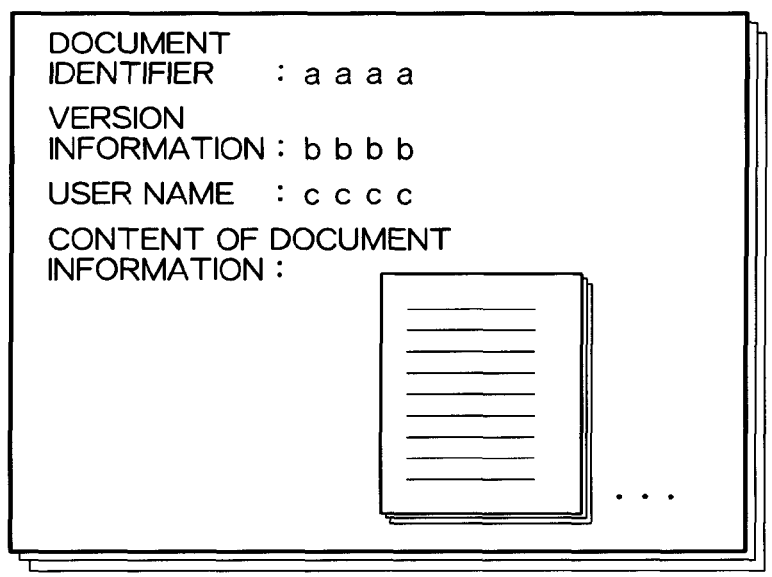
FIG. 3 is a diagram explaining an example database of document information held by the document management device according to the exemplary embodiment of the present invention.

The version management unit 21, having received document information to be newly held from the client device 2, assigns a unique document identifier thereto, and stores the received document information in the storage 12b in association with the assigned document identifier, the version information indicating the first version, and the information specifying the user of the client device 2 as a document database, as shown as an example in FIG. 3. The information specifying the user may be obtained by authenticating the user.

Further, the version management unit 21, having received a revision instruction, a document identifier, and document information from the client device 2, searches for the document database in the storage 12b for an entry containing an identifier identical to the received document identifier, and obtains the version information indicative of the latest version (the latest version information) from among the hits returned by the search. Suppose that document information having the document identifier "1" has been revised twice. In this case, an entry having the version information "1", or the version information indicating the first version, an entry having the version information "2", or the version information after the first revision, and an entry having the version information "3", or the version information after the second revision, are returned by the search. For simplification of the description, the version information is expressed using a number here, but this is not an exclusive example.

Then, the version management unit 21 updates the received latest version information to be a value indicating the next version. With number version information, for example, the number is incremented by one. In the above example, the latest version information, namely "3", is incremented by one to obtain version information "4". Thereafter, the version management unit 21 stores the received document information in the storage 12b in association with the received document identifier, the version information updated as above, and the information specifying the user of the client device 2 as a document database, as shown as an example in FIG. 3.

The version management unit 21 outputs the information (the document identifier and the version information) specifying the document information stored as described above to the change point extraction unit 22.

As described above, in this exemplary embodiment, each document is managed for every version thereof, using, as a key, the unique document identifier assigned thereto.

The change point extraction unit 22 receives the information specifying the document information having been stored at the time of revision from the version management unit 21, then extracts a point changed due to the revision in the document information compared with the concerned document information before the revision (pre-revision document information), and outputs information specifying the extracted change point to the additional information acquisition unit 24 and the additional information update unit 25. This extraction is carried out similarly to a process in response to a widely known extraction command, such as "diff", and details thereof are not described here.

In response to an instruction from the client device 2, the additional setting unit 23 records additional information, such as a character string or the like, in a designated position in the document information so as to be associated therewith. The position where the additional information is made associated in the document information is determined as follows.

For example, assume a case, such as a PDF (Portable Document Format) or the like, in which the document information is recorded in the form of an image to be printed on a sheet. In this case, the document information is virtually displayed in the form of an image which contains a series of page images to be printed on sheets according to designated conditions, including sheet and print conditions, and the position where additional information is made associated is specified by means of the number of a page contained in the image, and the coordinates on the page. Alternatively, the specification may be made utilizing the information specifying a designated position in a character string (such as the $x^{th}$ character from the top, or the like).

As shown in FIGS. 4A and 4B, the additional information includes, for every additional information item, a unique additional information identifier, information specifying the document information (a document identifier and version information) with which the concerned additional information is associated, information specifying the position in the document information, and the content of the additional information (FIG. 4A).

The additional information may further include information (a user name, a user identification number, and so forth) identifying the user having set the additional information, information specifying the additional information associated with the corresponding pre-revision document information (a parent identifier, or the like), attribute information describing the intention and/or outline of the additional information, the display size of the additional information, and so forth (FIG. 4B).

The additional information acquisition unit 24 receives information specifying a point changed due to the revision in the document information from the change point extraction unit 22, then selects additional information relevant to the specified change point from among those associated with the pre-revision document information, and outputs the additional information identifier of the selected additional information to the additional information update unit 25. An example of the selection of additional information relevant to the change point will be specifically described later.

The additional information update unit 25 operates such that the additional information in the pre-revision document information is also displayed in the revised document information. That is, the additional information update unit 25 searches for additional information items associated with the pre-revision document information, and sequentially selects the additional information items returned in the search as focused additional information. For every selection of focused additional information, the additional information update unit 25 carries out the following process.

Figure 5:
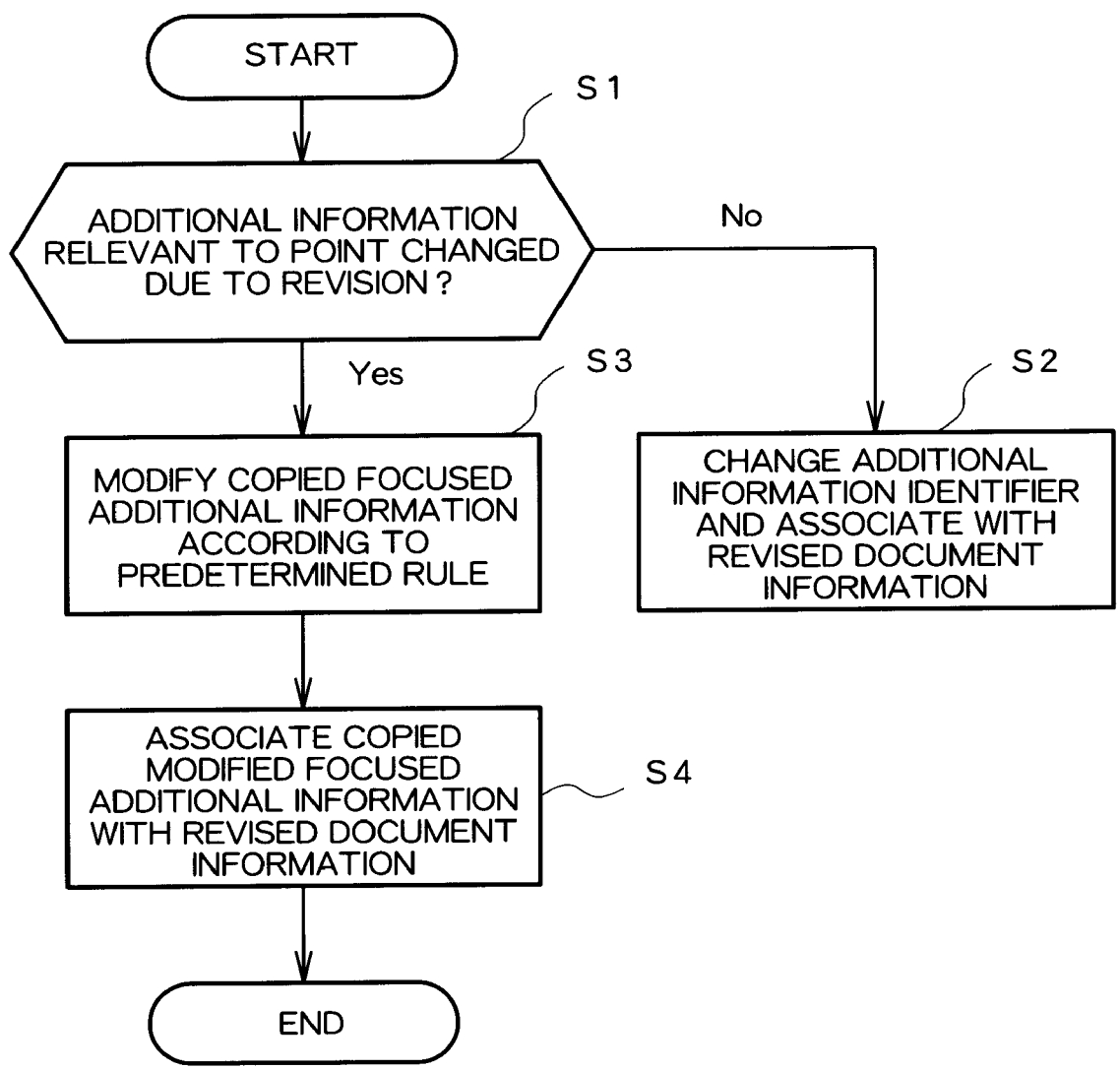
FIG. 5 is a flowchart of an example process carried out by the document management device according to the exemplary embodiment of the present invention.

That is, as shown in FIG. 5, the additional information update unit 25 determines whether or not the focused additional information is additional information associated with the additional information identifier received from the additional information acquisition unit 24 (S1). When the focused additional information is not additional information associated with the additional information identifier received from the additional information acquisition unit 24, the additional information update unit 25 copies the focused additional information, and rewrites the version information of the document information with which the copied focused additional information is associated, so as to specify the revised version (S2). In the above, a unique additional information identifier is assigned to the copied focused additional information.

Meanwhile, when it is determined at S1 that the focused additional information is additional information associated with the additional information identifier received from the additional information acquisition unit 24, the additional information update unit 25 copies the focused additional information, and then modifies the copied focused additional information according to a predetermined rule (S3). For example, the copied focused additional information may be updated based on the information specifying the point changed due to the revision in the document information, this information being input from the change point extraction unit 22. For example, when the focused additional information contains a character string relevant to the change point, a character string "modified" maybe added to the focused additional information.

Thereafter, the additional information update unit 25 rewrites the version information of the document information with which the copied focused additional information is associated, so as to specify the revised version (S4). Here also, a unique additional information identifier is assigned to the copied focused additional information. It should be noted that the process carried out by the additional information update unit 25 is not limited to the above-described example, and various other examples will be described later.

The additional information update unit 25 repeats the above-described process, while selecting the additional information items in the pre-revision document information as focused additional information.

In the above, as for additional information modified by the additional information update unit 25, the report unit 26 reports to a predetermined destination, maybe set in advance in the concerned additional information, for example, about the modification. In the above case, the content of the modification is reported to a report destination set in the modified additional information.

The document retrieving unit 27 receives the information (a document identifier and version information) specifying the document information to retrieve and a retrieval instruction from the client device 2. Then, the document retrieving unit 27 retrieves the specified document information from the storage 12b, and distributes the retrieved document information to the client device 2 having made the request.

In short, in this exemplary embodiment, when any document information is retrieved and updated, or revised, by the user of the client device 2, the version information after the revision is produced. In the revision, the additional information associated with the pre-revision document information is inherited in the revised document information. Also, whether or not to modify the additional information according to a predetermined rule is determined, and the additional information is modified when necessary.

In the following, an example of selection of additional information to be modified from among those associated with the pre-vision document information will be described. Suppose that additional information is associated with any position in the revised document information, and that the position is specified by means of the number of a page contained in the virtually formed image of the document information and the coordinates on the page. With this assumption, according to one example of the selection, the additional information acquisition unit 24 receives information specifying the point changed due to the revision in the document information from the change point extraction unit 22, and obtains information specifying the page and the area thereon where the change point is contained (for example, the coordinates of the respective vertices of the area). Then, the additional information acquisition unit 24 searches for additional information given within a range of a predetermined distance (for example, the distance to the area is equal to or smaller than a threshold d) from the detected page and area. The additional information acquisition unit 24 determines the additional information found in the search as additional information to be modified. The addition information acquisition unit 24 repeats this search for each change point. Then, the additional information acquisition unit 24 outputs the additional information identifier of the determined additional information.

Alternatively, the additional information acquisition unit 24 may search for additional information given in the range within a predetermined distance from an area enclosing the entire paragraph or row which contains the change point, instead of the distance from the area enclosing the change point, as additional information to be modified.

Meanwhile, when the additional information is associated with a part of a character string in the document information, the additional information acquisition unit 24 receives information specifying a point changed due to the revision in the document information from the change point extraction unit 22. Then, the additional information acquisition unit 24 searches for additional information associated with the changed character string (or a part thereof), and determines the additional information obtained in the search as additional information to be modified. The additional information acquisition unit 24 thereafter outputs the additional information identifier of the determined additional information.

In the above, when the character string extracted as a change point is contained in the additional information, the additional information update unit 25 modifies the additional information by including a character string "modified", or the like, in the additional information. This, however, is not an exclusive example of the manner of modification of additional information.

For example, there may be a case in which information about the intention of adding the additional information (such as "modification instruction", "check required", and so forth) is contained as attribute information in the additional information. In this case, the additional information update unit 25 may modify the additional information in a different manner depending on the attribute information contained in the relevant additional information selected by the additional information acquisition unit 24. For example, with the attribute information "modification instruction" contained, the additional information update unit 25 may modify the attribute information in the additional information for the revised document information so as to mean "modification completed".

Further, in the case where a rectangular strip-like area colored as designated is superimposed onto the document information, so that the content of the additional information, such as a character string, or the like, is shown therein for presentation, the additional information update unit 25 may modify the information designating the display color, such as the strip color or the color of the character string, so as to designate a predetermined specific color, when producing the modified additional information.

The additional information for modification is not limited to that which is associated with the revised document information. The additional information update unit 25 may modify, for example, the additional information selected by the additional information acquisition unit 24, or the additional information associated with the pre-revision document information.

For example, suppose that the attribute information in the additional information selected by the additional information acquisition unit 24 reads "modification instruction". In this case, the additional information update unit 25 may modify the attribute information of the selected additional information so as to read "modification completed". Similarly, the additional information update unit 25 may change the additional information selected by the additional information acquisition unit 24 so as to designate a predetermined specific color for the strip color or the color of the character string.

Also, suppose that the additional information selected by the additional information acquisition unit 24 from among those associated with the pre-revision document information satisfies a predetermined deletion condition. In this case, the additional information update unit 25 may perform control so as not to copy the additional information, so that the additional information satisfying the deletion condition is not inherited in the revised document information. For example, assume that the delete condition is "attribute information is a modification instruction". In this case, the additional information update unit 25 refers to the attribute information in the additional information associated with the pre-revision document information and selected by the additional information acquisition unit 24, and performs control so as not to copy the additional information having attribute information "modification instruction". As a result, the additional information which is a "modification instruction" is not shown in the revised document information when the designated modification is completed.

There may be a case in which the change point extraction unit 22 additionally outputs the information specifying the manner of changing a point in the document information. The information may read "delete", "add", "replace", and so forth. In this case, the additional information update unit 25 may modify the additional information, utilizing the information. Specifically, with information "delete" output, the additional information update unit 25 may include the character string "deleted", or the like, in the additional information included in the pre-revision or revised document information.

When associating the additional information, which is associated with the pre-revision document information, also with the revised document information, the additional information update unit 25 may include, to thereby record, the additional information identifier of the additional information associated with the pre-revision document information in the additional information to be associated with the revised document information. This arrangement enables mutual association between the pre-revision and revised additional information items via the additional information identifier when the additional information in the revised document information has corresponding additional information in the pre-revised document information.

For example, when additional information associated with the revised document information is given a predetermined operation (double clicking, or the like), the document management device 1 may refer to the additional information identifier of the additional information, and search for, and display, the corresponding additional information associated with the pre-revised document information. Alternatively, the document management device 1 may search for additional information in document information of different versions, the additional information being associated with the additional information subjected to the predetermined operation, and present the pre-revision document information associated with the additional information found in the search.

In the above, the above-described process is carried out when registering the revised document information. This is not an exclusive example however. Alternatively, the above-described process to modify the additional information may be carried out while the document information is being revised by the client device 2, or the like. For example, when the client device 2 receives an instruction for temporary storage of the document information being revised, the document management device 1 issues temporary version information, and stores the document to be temporarily stored. Then, the document management device 1 may determine a point changed in the temporarily stored document information compared with the pre-revision document information, and modify the additional information associated with the determined changed point.

In the above, the character string "modifying", or the like, may be included in the additional information associated with the pre-revision document information. Also, if the user revising the document information is identifiable through authentication, the additional information may be modified so as to read "being modified by user A", including the name of the user.

In the above, the document information of the original version is revised to produce a single revised version. However, there may be a case in which the original version may lead to production of mutually different versions 2A and 2B. With version branching acceptable, in this exemplary embodiment, the controller 11 of the document management device 1 may perform control, at the time of revision, such that the version information of the pre-revision document information is included in the revised document information so as to be associated therewith. For example, when the mutually different 2A and 2B versions are produced based on the first version, the information indicating the "first version" is included in the respective versions 2A and 2B as the pre-revision document information so as to be associated therewith.

Then, the controller 11 controls the additional information setting unit 23 so as to carry out the following, when recording the additional information, such as a character string, or the like, in the designated position in the document information so as to be associated therewith, according to an instruction from the client device 2.

That is, the additional information setting unit 23 determines whether or not the document information with which the additional information is newly associated (hereinafter, for discrimination, referred to as target document information) has associated information for specifying the pre-revision document information. When the document information has that specifying information, the additional information setting unit 23 obtains the specifying information, and then searches for other document information which contains the information identical to the obtained specifying information as information specifying the pre-revision document information. In other words, other document information produced based on the common document information is searched for. The other document information found in the search will be hereinafter referred to as a "family document".

As a specific example of the above, suppose that mutually different versions 2A and 2B are produced based on the first version, as described above. In this case, when it is instructed to include additional information in the document information of the version 2A so as to be associated therewith, the first version information, or the version information contained in the document information of the version 2A as information specifying the pre-vision information thereof, is searched for. That is, other information document containing the first version information as information specifying the pre-version document information is searched for. Consequently, in the above, the version 2B is found in the search as a family document.

Then, the additional information setting unit 23 extracts a part of the target document information within a predetermined range from the position with which the additional information is associated. When the position is specified by means of the number of a page of the virtually formed document information and the coordinates on the page, the predetermined range may be determined as the entire paragraph, or the like, which contains the character string located closest to the coordinates.

Thereafter, the additional information setting unit 23 searches for a family document which contains a part identical to the extracted part. With such a family document found, the additional information having been instructed to be associated with the target document information is copied and recorded in the vicinity of the position where the part is located in the found family document, so as to be associated therewith. A unique additional information identifier is given to the copied additional information.

Specifically, in the above example, with additional information such as "Is [COPT] a typo of [COPY]?", or the like, given in the vicinity of the character string "COPT" in the version 2A, a part containing "COPT" is searched for in the document information of the version 2B, or the family document. With such a part found in the document information of the version 2B, the additional information "Is [COPT] a typo of [COPY]?" is recorded in the vicinity of the "COPT" so as to be associated therewith.

Further, the additional information setting unit 23 may obtain additional information identifier of the additional information to be copied, and the additional information setting unit 23 may record in the additional information to be associated with the family document as related additional information.

The additional information identifier, serving as the related additional information, can be used in the following process. That is, when modifying the additional information, the information update unit 25 searches for other additional information which contains the additional information identifier of the modified additional information (hereinafter referred to a modification target additional information) as related additional information.

With such additional information found in the search, the additional information update unit 25 also modifies the found additional information. For example, the found additional information may be modified by including a message, such as "modified in other version". The found and modified additional information may further include the additional information identifier of the modification target additional information as a reference identifier.

Alternatively, instead of modifying the additional information itself, the additional information update unit 25 may produce and record new additional information containing a message, such as "modified in different version" in the vicinity of (an adjacent position, for example) the found additional information so as to be associated therewith. Similar to the above, the newly produced additional information may include the additional information identifier of the modification target additional information as a reference identifier.

Then, when a predetermined operation (for example, double clicking, or the like) is applied to additional information containing a reference identifier, the controller 11 may display the additional information identified by the reference identifier. Also, the controller 11 may additionally display the document information with which the additional information identified by the reference identifier is associated (with the point with which the additional information is associated displayed in a highlighted manner).

Here, there may be a case in which repetitive modifications of the document information result in retrieving the original content. For example, suppose that the character string "copy document to produce copied document" in the first version document information is requested to be modified so as to read "copy document" as it is difficult to understand, and that after revision to "copy document" in the second version, the part in question is again modified to read "copy document to produce copied document", identical to the original content, in the third version.

In connection with the above, in this exemplary embodiment, the additional information update unit 25 may carry out the following at the time of revision. In the following, the revised document information is hereinafter referred to as a final version document.

That is, the additional information update unit 25 determines additional information relevant to a point changed (a change point) due to the revision in the document information as focused additional information, and when modifying the focused additional information later, includes therein the additional information identifier of the corresponding additional information in the pre-revision document information as a parent identifier. In the above, the additional information is not deleted in the revised document information (though the additional information may remain invisible by not being displayed).

The additional information update unit 25 determines whether or not the additional information selected in connection with a change point contains a parent identifier. With a parent identifier contained, the additional information update unit 25 extracts a part of the document information, in the vicinity of the parent identifier. Then, the additional information update unit 25 determines whether or not a part in the vicinity of the focused additional information in the final version document coincides with the extracted part. With the parts coinciding with each other, the additional information identified by the parent identifier is copied, and included as the content of the focused additional information. A unique identifier is given to the focused additional information.

The above arrangement makes it possible to have the past additional information associated again with the part having retrieved the original content thereof through the repetitive revisions.

There may be a case in which a person in charge of document information revision should overlook, at the time of revision, the additional information which is a change request. In consideration of such a case, the additional information update unit 25 may carry out the following.

That is, regarding the additional information other than that selected as being in the vicinity of a change point among information associated with the pre-vision document information, the additional information update unit 25 may modify the addition information so as to change the manner of display thereof. For example, additional information containing designation of a letter size for display thereof may be modified so as to designate an enlarged letter size. Additional information containing designation of a display color thereof may be modified so as to designate a different strip color.

The target to which the above-described process is applied by the additional information update unit 25 may be limited to those having specific attribute information (for example, a "change request" and so forth).

That is, when additional information which is a change request is overlooked, generally, a portion in the vicinity of the overlooked additional information is not changed, and therefore not extracted as a change point. Thus, the overlooked additional information is not selected for modification. In this case, with application of the above described process, additional information which satisfies a predetermined condition (for example, attribute information having attribute information "change request", or the like) is displayed in a manner different from the rest, such as in larger letters, or the like.

In the above, in order to extract a character string associated with additional information, the position associated with the additional information in the document information is referred to, and the character string present in the vicinity of the position is extracted and processed.

This is not an exclusive example however. Alternatively, for example, to add additional information, the document management device 1 may encourage the user to specify a character string with which the additional information is associated, and include the specified character string in the additional information to be added, as target character string information. With this arrangement, the character string associated with the additional information can be obtained simply by extracting the target character string information contained in the additional information.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A document processing device, comprising:
   a storage unit that stores an index, wherein the index associates:
      a first version of a file with a first annotation through a key;
      the first annotation with a first position at which the first annotation occurs within the first version of the file;
      a second version of file with a second annotation through the key;
      the second annotation with a second position at which the second annotation occurs within the second version of the file; and
      the first version of the file and the second version of the file through the key; and
   a processor, the processor functioning as:
      a change point determination unit that receives the first version of the file and the second version of the file, determines that the second version of the file contains changed information different from information in the first version of the file, and determines a changed position at which the changed information occurs in the first version of the file;
      an annotation acquisition unit that receives the changed position from the change point determination unit, determines that the changed position is associated with the first position using the index, determines that the first annotation is associated with the changed position using the index, and selects the first annotation based on a result of the determination that the first annotation is associated with the changed position;
      an additional information modification unit that modifies the character string included in the first annotation to create a modified annotation and stores the modified annotation in the storage unit as the second annotation.

2. The document processing device according to claim 1, wherein the additional information modification unit modifies, while referring to attribute information contained in the first annotation, the first annotation according to a rule based on the attribute information.

3. The document processing device according to claim 1, wherein, in modifying the first annotation, information about a color for displaying the first annotation is modified so as to create the modified annotation to be displayed in a color different than a color of the first annotation.

4. The document processing device according to claim 1, wherein the additional information modification unit modifies the first annotation according to a rule.

5. The document processing device according to claim 1, wherein
   the additional information modification unit updates both of the first annotation and the second annotation associated with the changed position respectively.

6. A computer readable recording medium storing a program causing a computer to execute a process comprising:
   receiving a first version of a file and a second version of a file;
   determining that the second version of the file contains changed information different from information in the first version of the file;
   determining a changed position at which the changed information occurs in the first version of the file;
   determining that the changed position is associated with the first position using an index;
   determining a first annotation associated with the changed position using the index;
   selecting the first annotation based on a result of the determination that the first annotation is associated with the changed position;
   modifying the character string included in the first annotation to create a modified annotation; and
   storing the modified annotation in the storage unit as the second annotation,
   wherein the index associates:
      a first version of a file with a first annotation through a key;
      the first annotation with a first position at which the first annotation occurs within the first version of the file;
      a second version of file with a second annotation through the key;
      the second annotation with a second position at which the second annotation occurs within the second version of the file; and
   the first version of the file and the second version of the file through the key.

7. The computer readable recording medium according to claim 6, wherein the modifying comprises, while referring to attribute information contained in the first annotation, the first annotation is modified according to a rule based on the attribute information.

8. The computer readable recording medium according to claim 6, wherein the modifying comprises modifying the first annotation so as to create the modified annotation to be displayed in a color different than a color of the first annotation.

9. The computer readable recording medium according to claim 6, wherein the modifying comprises modifying the first annotation according to a rule.

10. The computer readable recording medium according to claim 6, further comprising updating the index to associate both of the first annotation and the second annotation with the changed position respectively.

11. A document processing method comprising:
    receiving a first version of a file and a second version of a file;
    determining that the second version of the file contains changed information different from information in the first version of the file;

determining a changed position at which the changed information occurs in the first version of the file;

determining that the changed position is associated with the first position using an index;

determining a first annotation associated with the changed position using the index;

selecting the first annotation based on a result of the determination that the first annotation is associated with the changed position;

modifying the character string included in the first annotation to create a modified annotation; and storing the modified annotation in the storage unit as the second annotation, wherein the index associates:

a first version of a file with a first annotation through a key;

the first annotation with a first position at which the first annotation occurs within the first version of the file;

a second version of file with a second annotation through the key;

the second annotation with a second position at which the second annotation occurs within the second version of the file; and the first version of the file and the second version of the file through the key.

12. The document processing method according to claim 11, wherein the modifying comprises, while referring to attribute information contained in the first annotation, the first annotation is modified according to a rule based on the attribute information.

13. The document processing method according to claim 11, wherein the modifying comprises modifying the first annotation so as to create the modified annotation to be displayed in a color different than a color of the first annotation.

14. The document processing method according to claim 11, wherein the modifying comprises modifying the first annotation according to a rule.

15. The document processing method according to claim 11, further comprising updating the index to associate both of the first annotation and the second annotation with the changed position respectively.

\* \* \* \* \*